(12) United States Patent
Sun et al.

(10) Patent No.: US 11,744,274 B2
(45) Date of Patent: Sep. 5, 2023

(54) FULLY AUTOMATIC PEANUTS PEELING ROBOT FOR SEEDS RETENTION AND METHOD FOR USING THE SAME

(71) Applicant: Liaocheng University, Liaocheng (CN)

(72) Inventors: Qun Sun, Liaocheng (CN); Fuguo Ren, Liaocheng (CN); Ying Zhao, Liaocheng (CN); Dongjie Zhao, Liaocheng (CN)

(73) Assignee: Liaocheng University, Liaocheng (CN)

( * ) Notice: Subject to any disclaimer, the term of this patent is extended or adjusted under 35 U.S.C. 154(b) by 0 days.

(21) Appl. No.: 17/621,974

(22) PCT Filed: Apr. 14, 2021

(86) PCT No.: PCT/CN2021/087215
§ 371 (c)(1),
(2) Date: Dec. 22, 2021

(87) PCT Pub. No.: WO2022/057247
PCT Pub. Date: Mar. 24, 2022

(65) Prior Publication Data
US 2022/0361551 A1    Nov. 17, 2022

(30) Foreign Application Priority Data
Sep. 16, 2020    (CN) .......................... 202010973658.6

(51) Int. Cl.
*A23N 5/01*    (2006.01)
*B07B 1/28*    (2006.01)
*B25J 11/00*    (2006.01)
*B07B 1/42*    (2006.01)

(52) U.S. Cl.
CPC .................. *A23N 5/01* (2013.01); *B07B 1/28* (2013.01); *B07B 1/42* (2013.01); *B25J 11/00* (2013.01)

(58) Field of Classification Search
CPC ..... B07B 1/28; B07B 1/42; A23N 5/01; B25J 11/00
USPC ............................................................ 209/2
See application file for complete search history.

(56) References Cited

FOREIGN PATENT DOCUMENTS

| CN | 104905387 A | * | 9/2015 | |
|---|---|---|---|---|
| CN | 204837894 U | * | 12/2015 | |
| CN | 109043569 A | * | 12/2018 | .............. A23N 5/01 |
| CN | 112107004 A | * | 12/2020 | .............. A23N 5/01 |
| WO | WO-2015166116 A1 | * | 11/2015 | .............. A23L 7/10 |
| WO | WO-2022057247 A1 | * | 3/2022 | .............. A23N 5/01 |

* cited by examiner

*Primary Examiner* — Terrell H Matthews
(74) *Attorney, Agent, or Firm* — Jenei LLC

(57) ABSTRACT

A fully automatic peanuts peeling robot for seeds retention and a method using the same are provided. The robot includes a processing mechanism, a feeding mechanism and a screening mechanism. The processing mechanism includes an aluminum profile support bracket, a bracket assembly, a conveyor belt device, and a conversion device, a sensor device and a cut-off device; the aluminum profile support bracket is fixedly connected to the bracket assembly; the bracket assembly includes a first bracket assembly, a second bracket assembly, and a third bracket assembly; and the aluminum profile support bracket is fixedly connected to the conveyor belt device; the conveyor belt device includes a first conveyor belt assembly, a second conveyor belt assembly, and a third conveyor belt assembly; the conveyor belt device is fixedly connected to the conversion device.

9 Claims, 16 Drawing Sheets

FULLY AUTOMATIC PEANUTS PEELING ROBOT FOR SEEDS RETENTION AND METHOD FOR USING THE SAME

CROSS REFERENCE TO RELATED APPLICATION

This application is a national stage application, filed under 35 U.S.C. § 371, of International Patent Application No. PCT/CN2021/087215, entitled "FULLY AUTOMATIC PEANUTS PEELING ROBOT FOR SEEDS RETENTION AND METHOD USING THE SAME", filed Apr. 14, 2021, which claims the benefit to claims the benefit and priority of Chinese Patent Application No. 202010973658.6, entitled "FULLY AUTOMATIC PEANUTS PEELING ROBOT FOR SEEDS RETENTION AND METHOD USING THE SAME" filed with the Chinese Patent Office on Sep. 16, 2020, the disclosure of which is incorporated by reference herein in its entirety.

TECHNICAL FIELD

The present disclosure relates to the field of agricultural machinery equipment, in particular to a fully automatic peanuts peeling robot for seeds retention and a method using the same.

BACKGROUND ART

The peanut peeling machines on the current market are basically steel grain rods and steel grid concave plates which are mainly used for striking and kneading, and has two types of the rubber roller and the rubber floating concave plate which are mainly used for extruding and kneading. The quality of peeling is uneven, so the damage rate of the shells of the peanuts for seeds retention is relatively high. The peeled peanut seeds are mainly used for oil extraction and eating, which cannot meet a requirement of using as seeds. However, manual peeling by manpower not only makes fingers of famers easy to fatigue and be injured, but also has a very low work efficiency. Thus, the farmers in the peanut production area urgently require machines to replace the manual peeling. This is the shortcoming of the prior art.

SUMMARY

The technical problem to be solved by the embodiments is to provide a fully automatic peanuts peeling robot for seeds retention and a method using the same, which has simple structure, low damage rate and convenient operation.

In order to achieve the purpose, the present disclosure provides the following technical solutions:

A fully automatic peanuts peeling robot for seeds retention, the fully automatic peeling robot including a processing mechanism, a feeding mechanism and a screening mechanism.

The processing mechanism includes an aluminum profile support bracket, a bracket assembly, a conveyor belt device, a conversion device, a sensor device and a cut-off device;

The aluminum profile support bracket is fixedly connected to the bracket assembly;

The bracket assembly includes a first bracket assembly, a second bracket assembly, and a third bracket assembly;

The aluminum profile support bracket is fixedly connected to the conveyor belt device;

The conveyor belt device includes a first conveyor belt assembly, a second conveyor belt assembly, and a third conveyor belt assembly;

The conversion device includes a first direction conversion device and a second direction conversion device;

The bracket assembly is fixedly connected to the sensor device;

The bracket assembly is fixedly connected to the cut-off device;

The screening mechanism is arranged on a lower side of the bracket assembly.

In some embodiments, the first bracket assembly includes a first aluminum profile support bracket, and the aluminum profile support bracket may be fixedly connected to the first aluminum profile support bracket, one side of the first aluminum profile support bracket may be fixedly connected to a first horizontal single-arm robot, a sliding block of the first horizontal single-arm robot may be fixedly connected to a first longitudinal single-arm robot, a sliding block of the first longitudinal single-arm robot may be fixedly connected to a first pneumatic finger, and an other side of the first aluminum profile support bracket may be fixedly connected to a second horizontal single-arm robot, and a sliding block of the second horizontal single-arm robot may be fixedly connected to a second longitudinal single-arm robot, a sliding block of the second longitudinal single-arm robot may be fixedly connected to a second pneumatic finger; the second bracket assembly includes a second aluminum profile support bracket, and the aluminum profile support bracket may be fixedly connected to the second aluminum profile support bracket, the second aluminum profile support bracket may be fixedly connected to a third horizontal single-arm robot, and a sliding block of the third horizontal single-arm robot may be fixedly connected to a third longitudinal single-arm robot, a sliding block of the third longitudinal single-arm robot may be fixedly connected to a third pneumatic finger, the aluminum profile support bracket may be fixedly connected to a first fixed connecting plate, a fourth miniature single-arm robot and a fifth miniature single-arm robot may be fixedly connected to the first fixed connecting plate and may be arranged symmetrically, the fourth miniature single-arm robot and the fifth miniature single-arm robot may be respectively fixedly connected to a fourth pneumatic finger and a fifth pneumatic finger which may be arranged symmetrically; the third bracket assembly includes a third aluminum profile support bracket, the aluminum profile support bracket may be fixedly connected to the third aluminum profile support bracket, and the third aluminum profile support bracket may be fixedly connected to a fourth horizontal single-arm robot, and a sliding block of the fourth horizontal single-arm robot may be fixedly connected to a sixth longitudinal single-arm robot, a sliding block of the sixth longitudinal single-arm robot may be fixedly connected to a sixth pneumatic finger, and the aluminum profile support bracket may be fixed connected to a second fixed connecting plate, a seventh miniature single-arm robot and a eighth miniature single-arm robot may be fixedly connected to the second fixed connecting plate and may be arranged symmetrically, the seventh miniature single-arm robot and the eighth miniature single-arm robot may be respectively fixedly connected to a seventh pneumatic finger and a eighth pneumatic finger.

In some embodiments, the first conveyor belt assembly includes symmetrically arranged first conveyor belt bases, the aluminum profile support bracket may be fixedly connected the symmetrically arranged first conveyor belt bases, each of the symmetrically arranged first conveyor belt bases may be fixedly connected to a first conveyor belt support bracket, and one of the first conveyor belt bases may be fixedly connected to a first conveyor belt drive motor, the first conveyor belt drive motor may pass through the one of the first conveyor belt bases, the first conveyor belt drive motor may be fixedly connected to a first conveyor belt pulley, the first conveyor belt support bracket may be hinged to a group of first conveyor belt rollers, and a first conveyor belt may be wound around the group of the first conveyor belt rollers and the first conveyor belt pulley; the second conveyor belt assembly includes symmetrically arranged second conveyor belt bases, the aluminum profile support bracket may be fixedly connected to the symmetrically arranged second conveyor belt bases, each of the symmetrically arranged second conveyor belt bases may be fixedly connected to a second conveyor belt support bracket, and one of the second conveyor belt bases may be fixedly connected to a second conveyor belt drive motor, and the second conveyor belt drive motor may pass through the one of the second conveyor belt bases, the second conveyor belt drive motor may be fixedly connected to a second conveyor belt pulley, the second conveyor belt support bracket may be hinged to a group of second conveyor belt rollers, a second conveyor belt may be wound around the group of the second conveyor belt rollers and the second conveyor belt pulley; the third conveyor belt assembly includes a symmetrically arranged third conveyor belt bases, the aluminum profile support bracket may be fixedly connected to the symmetrically arranged third conveyor belt bases, each of the symmetrically arranged third conveyor belt bases may be fixedly connected to a third conveyor belt support bracket, and one of the third conveyor belt bases may be fixedly connected to a third conveyor belt drive motor, the third conveyor belt drive motor passes through the one of the third conveyor belt bases, the third conveyor belt drive motor may be fixedly connected to a third conveyor belt pulley, the third conveyor belt support bracket may be hinged to a group of third conveyor belt rollers, and a third conveyor belt may be wound around the group of the third conveyor belt rollers and the third conveyor belt pulley.

In some embodiments, the first direction conversion device includes a first direction conversion motor, the second conveyor belt support bracket may be fixedly connected to the first direction conversion motor, an output shaft of the first direction conversion motor may be fixedly connected to a first direction conversion disc; and the second direction conversion device includes a second direction conversion motor, the third conveyor belt support bracket may be fixedly connected to the second direction conversion motor, and an output shaft of the second direction conversion motor may be fixedly connected to a second direction conversion disc.

In some embodiments, the sensor device includes a first camera sensor, a second camera sensor and a third camera sensor, the second aluminum profile support bracket may be fixedly connected to the first camera sensor, and the second camera sensor and the third camera sensors may be fixedly connected to the first aluminum profile support bracket.

In some embodiments, the cut-off device may be a cut-off cylinder, and the second aluminum profile support bracket may be fixedly connected to the cut-off cylinder.

In some embodiments, the first fixed connecting plate may be provided with a first inclined discharge outlet in a middle thereof, and the second fixed connecting plate may be provided with a second inclined discharge outlet in a middle thereof.

In some embodiments, the screening mechanism includes a screening device support bracket, and the screening device support bracket may be fixedly connected to a screening device drive motor, the screening device support bracket may be fixedly connected to symmetrically arranged bearing seat assemblies, an output shaft of the screening device drive motor may be fixedly connected to a screening device driving wheel, the screening device driving wheel may be connected to a screening device driven wheel via a belt, each of the symmetrically arranged bearing seat assemblies may be hinged to a crank connecting shaft, and the crank connecting shaft may be fixedly connected to the screening device driven wheel, an outer side of an inflection point of the crank connecting shaft may be sleeved on one end of a reciprocating connecting rod, and an other end of the reciprocating connecting rod may be hinged to an end of a bottom of a screening plate, inner sides of two vertical plates of the screening device support bracket may be each fixedly connected with a group of evenly distributed circular support rods, and a lower side of the screening plate may be in contact with the circular support rods.

In some embodiments, the feeding mechanism includes a peanut vibrating feeding tray and a peanut vibrating feeding tray support bracket which may be fixedly connected with each other.

A peeling method using the fully automatic peanuts peeling robot for seeds retention of the present disclosure is that:

putting the peanuts into a peanut vibration feeding tray of the fully automatic peeling robot;

controlling the peanut vibrating feed tray to vibrate by a controller connected to the peanut vibrating feed tray, and sending the peanuts from a circular track of the peanut vibrating feed tray to a discharge port of the peanut vibrating feed tray sequentially;

controlling a cut-off cylinder of the fully automatic peeling robot by the controller connected to the cut-off cylinder, and when a telescopic shaft of the cut-off cylinder retracts, enabling the discharge port of the peanut vibrating feeding tray to not be blocked, and the peanuts to enter a first conveyor belt of the fully automatic peeling robot;

detecting sizes, shapes and positions of the peanuts on the first conveyor belt by a first camera sensor of the sensor device, transmitting first data to the controller, and controlling subsequent components to perform corresponding actions by the controller;

determining whether the peanuts are suitable to be used as seeds by the controller, when the peanuts after being detected meet the standard and heads of first ones of the peanuts are towards a moving direction of the first conveyor belt, controlling a first horizontal single-arm robot of the fully automatic peeling robot, a first longitudinal single-arm robot of the fully automatic peeling robot and a first pneumatic finger of the first bracket assembly to grab the first ones of the peanuts onto a second conveyor belt of the fully automatic peeling robot;

detecting positions and states of the first ones of the peanuts on the second conveyor belt by a second camera sensor of the sensor device, and the second conveyor belt moves in an opposite direction to the first conveyor belt;

transmitting second data to the controller after detecting that the first ones of the peanuts on the second conveyor belt reach a first predetermined position, enabling the first ones of the peanuts follow the second conveyor belt to move to an end of the second conveyor belt and fall longitudinally into a groove of a first direction conversion disc of the conversion device, driving the first direction conversion disc to rotate by a first direction conversion motor of the conversion device to change the first ones of the peanuts from a horizontal state to a vertical state, and stopping the first direction conversion motor;

moving a third pneumatic finger of the fully automatic peeling robot, by a third horizontal single-arm robot and a third longitudinal single-arm robot of the fully automatic peeling robot, to a position corresponding to the first ones of the peanuts that are in the vertical state, grabbing the first ones of the peanuts by the third pneumatic finger and applying a clamping force to the first ones of the peanuts to form small openings thereon; driving the third pneumatic finger to move towards a fourth pneumatic finger and a fifth pneumatic finger of the fully automatic peeling robot by the third horizontal single-arm robot, and enabling the third pneumatic finger to reach a second predetermined position; moving each of the fourth pneumatic finger and the fifth pneumatic finger by a respective connected miniature single-arm robot of the fully automatic peeling robot, enabling each of the fourth pneumatic finger and the fifth pneumatic finger to grab a corresponding side of one of the first ones of the peanuts, and to move in an opposite direction simultaneously, so as to divide a shell of the one of the first ones of the peanuts into two parts;

enabling a seed and the shell of each of the first ones of the peanuts after dividing to fall into the screening mechanism through a first inclined discharge outlet of the fully automatic peeling robot, and separating the seed and the shell of each of first ones of the peanuts by a movement of a screening plate of the screening mechanism, and collecting the seed to enable a desired effect;

when the peanuts after being detected meet the standard and heads of second ones of the peanuts towards a direction which is opposite to the moving direction of the first conveyor belt, controlling a second single-arm robot, a second miniature single-arm robot and a second pneumatic finger of the first bracket assembly to grab the second ones of the peanuts onto a third conveyor belt of the fully automatic peeling robot, and enabling unqualified peanuts of the second ones the peanuts to follow a movement of the first conveyor belt and fall off;

detecting positions and states of the second ones of the peanuts which are on the third conveyor belt by a third camera sensor of the sensor device, and the third conveyor belt has a same movement direction as the first conveyor belt;

transmitting third data to the controller after detecting that the second ones of peanuts which are on the third conveyor belt reach a third predetermined position, enabling the second ones of the peanuts follow the third conveyor belt to move to an end of the third conveyor belt and fall longitudinally into a groove of a second direction conversion disc of the conversion device, controlling a second direction conversion motor of the conversion device to drive the second direction conversion disc to rotate by the controller, so as to change the second ones of the peanuts to be in the vertical state, and stopping the second direction conversion motor;

moving a sixth pneumatic finger of the fully automatic peeling robot to a position corresponding to the second ones of the peanuts that are in the vertical state by a fourth horizontal single-arm robot and a sixth longitudinal single-arm robot of the fully automatic peeling robot, grabbing the second ones of the peanuts by the sixth pneumatic finger and applying another clamping force to the second ones of the peanuts to form other small openings thereon, driving the sixth pneumatic finger to move towards a seventh pneumatic finger and a eighth pneumatic finger of the fully automatic peeling robot by the fourth horizontal single-arm robot, and enabling the sixth pneumatic finger to reach a fourth predetermined position; moving each of the seventh pneumatic finger and the eighth pneumatic finger by a corresponding connected miniature single-arm robot of the fully automatic peeling robot, and enabling each of the seventh pneumatic finger and the eighth pneumatic finger to grab a corresponding side of one of the second ones of the peanuts, and to move in another opposite direction simultaneously, so as to divide another shell of the one of the second ones of the peanuts into two parts;

enabling another seed and the another shell of each of the second ones of the peanuts after another dividing to fall into the screening mechanism through a second inclined discharge outlet of the fully automatic peeling robot, and separating the another seed and the another shell of each of the second ones of the peanuts by the movement of the screening plate of the screening mechanism, and collecting the seed to enable a desired effect.

Compared with the prior art, the advantages and positive effects of the embodiments are as follows.

Firstly, a process of imitating manual peanut peeling is realized through the movement of various mechanical arms. The process of manual peeling is reasonably divided and realized in sequence by using multi-stage mechanical arms, so that an effect of manual peeling is achieved and the speed and the efficiency of the peeling is improved.

Secondly, the reciprocating movement of the screening plate of the device may realize the separation of a seed and a shell of each peanut, and reduce the labor intensity of the staff.

Finally, the device makes farmers in the peanut production area unnecessary to use the most primitive peeling method for peeling, thus greatly reducing the physical labor of the farmers, and meanwhile improving the efficiency of peeling the peanuts.

Figure 1:
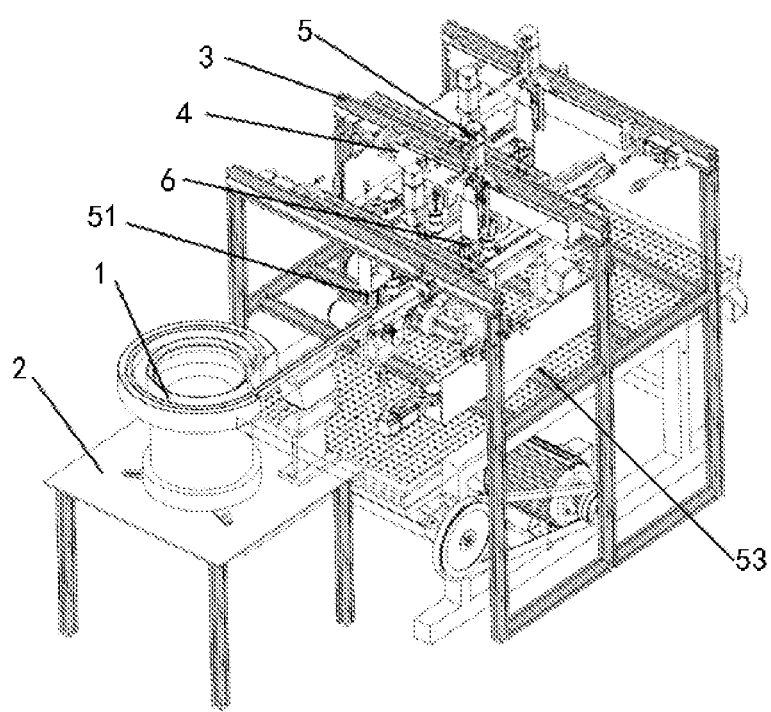
FIG. 1 is a first perspective diagram of a structure according to an embodiment of the present disclosure.

The reference numerals of drawings: 1 peanut vibration feeding tray; 2 peanut vibration feeding tray support bracket; 3 The first aluminum profile support bracket; 4 first horizontal single-arm robot; 5 first longitudinal single-arm robot; 6 first pneumatic finger; 7 second horizontal single-arm robot; 8 second longitudinal single-arm robot; 9 second pneumatic finger 10 second aluminum profile support bracket; 11 third horizontal single-arm robot; 12 third Longitudinal single-arm robot; 13 the third pneumatic finger; 14 the fourth miniature single-arm robot; 15 the fourth pneumatic finger; 16 the fifth miniature single-arm robot; 17 the fifth pneumatic finger; 18 the third aluminum profile Support bracket; 19 the fourth horizontal single-arm robot; 20 the sixth longitudinal single-arm robot; 21 the sixth pneumatic finger; 22 the seventh miniature single arm robot; 23 the seventh pneumatic finger; 24 the eighth miniature single arm robot; 25 eighth pneumatic finger; 26 first conveyor belt support bracket; 27 first conveyor belt base; 28 first conveyor belt roller; 29 first conveyor belt; 30 first conveyor belt pulley; 31 first conveyor belt drive motor; 32 second conveyor belt support bracket; 33 second conveyor belt base; 34 second conveyor belt rollers; 35 second conveyor belt; 36 second conveyor belt pulley; 37 second conveyor belt drive motor; 38 third conveyor belt support bracket; 39 third conveyor belt base; 40 third conveyor belt roller; 41 third conveyor belt; 42 third conveyor belt pulley; 43 third conveyor belt drive motor; 44 first direction conversion motor; 45 first direction conversion disc; 46 second direction conversion motor; 47 second direction conversion disc; 48 first camera sensor; 49 second camera sensor; 50 third camera sensor; 51 stop cylinder; 52 screening device support bracket; 53 first inclined discharge outlet; 54 second inclined discharge outlet; 55 screening plate, 5 56 screening device drive motor; 57 screening device driving wheel; 58 screening device driven wheel; 59 crank connecting shaft; 60 bearing seat assembly; 61 reciprocating connecting rod; 62 aluminum profile support bracket; 63 first fixed connecting plate; 64 second fixed connecting plate.

DETAILED DESCRIPTION OF THE EMBODIMENTS

A specific embodiment of the present disclosure will be described in detail below with reference to the accompanying drawings, but it should be understood that the protection scope of the present disclosure is not limited by the specific embodiments.

Figure 2:
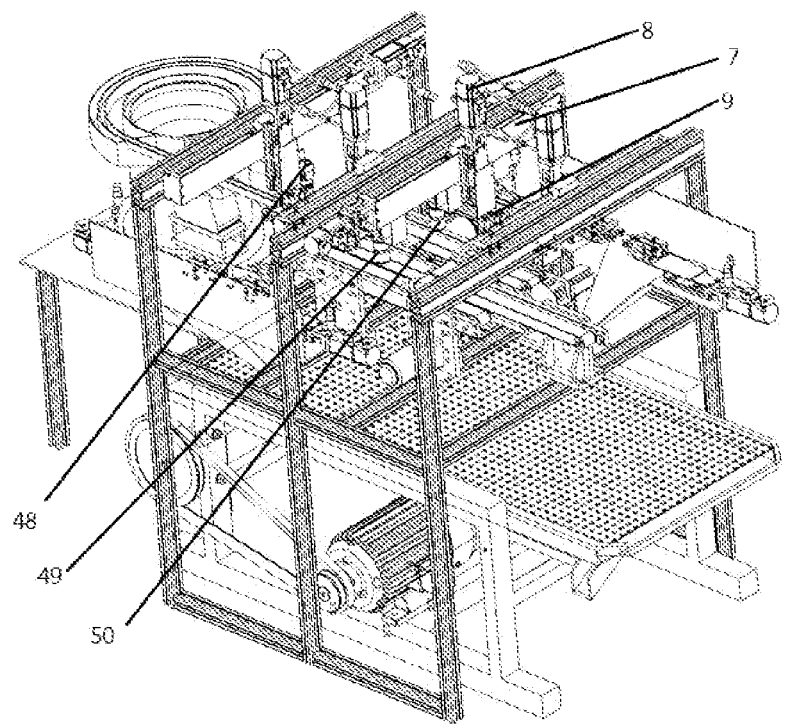
FIG. 2 is a first partial structural diagram of the present disclosure.
Figure 3:
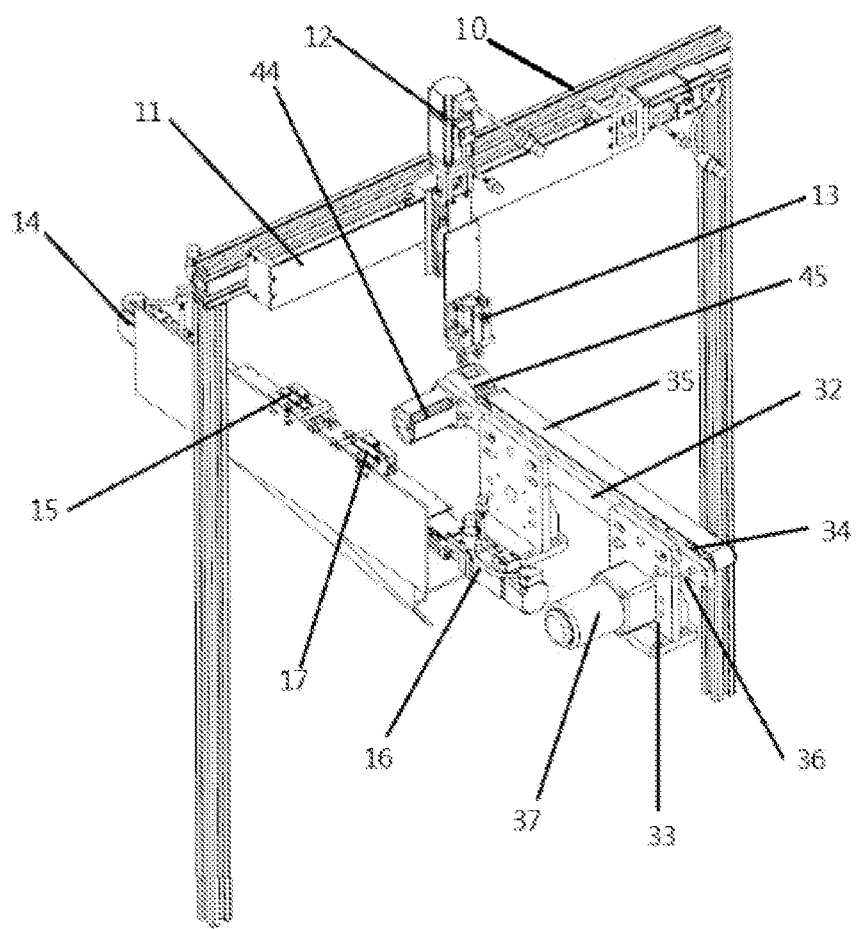
FIG. 3 is a second partial structural diagram of the present disclosure.
Figure 4:
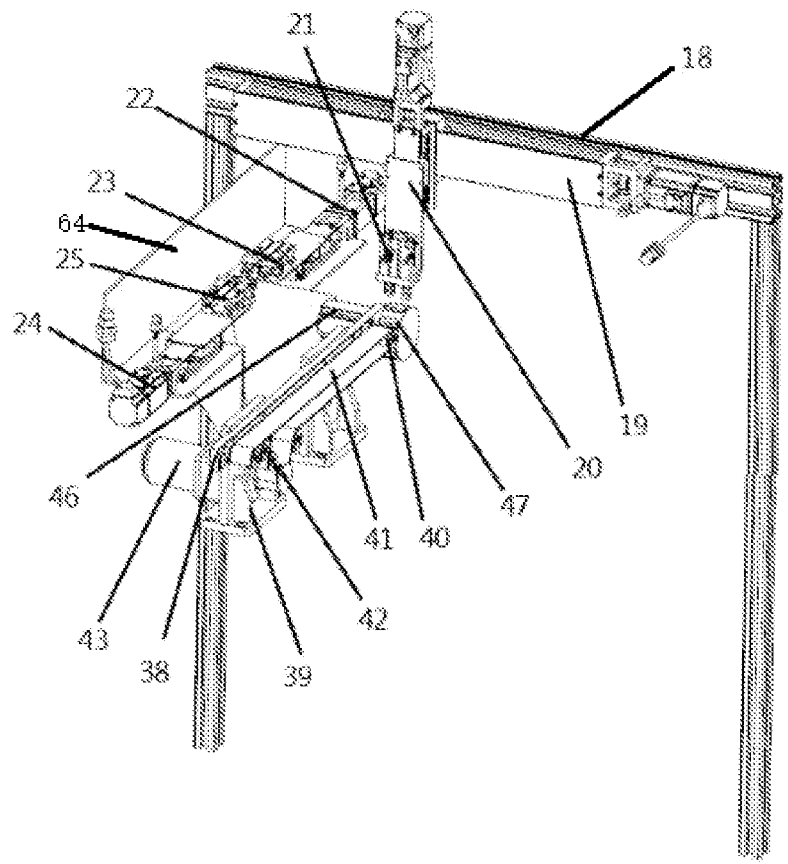
FIG. 4 is a third partial structural diagram of the present disclosure.
Figure 5:
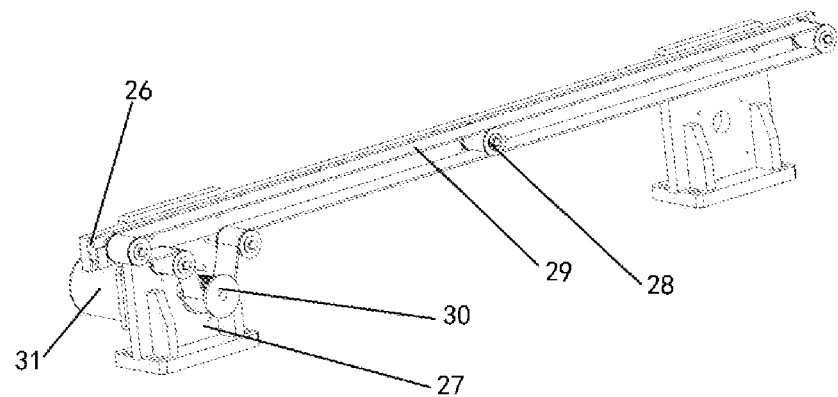
FIG. 5 is a fourth partial structural diagram of the present disclosure.
Figure 6:
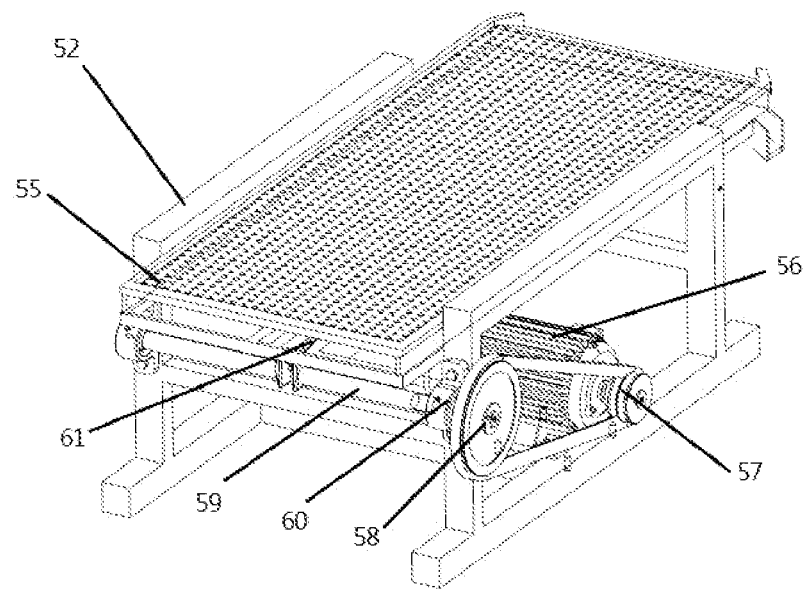
FIG. 6 is a fifth partial structural diagram of the present disclosure.
Figure 7:
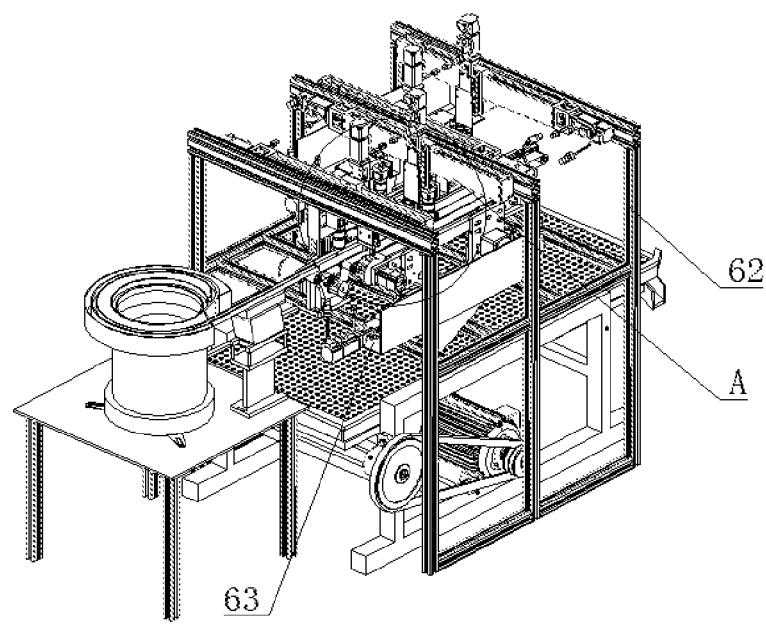
FIG. 7 is a second perspective diagram of the structure according to an embodiment of the present disclosure.
Figure 8:
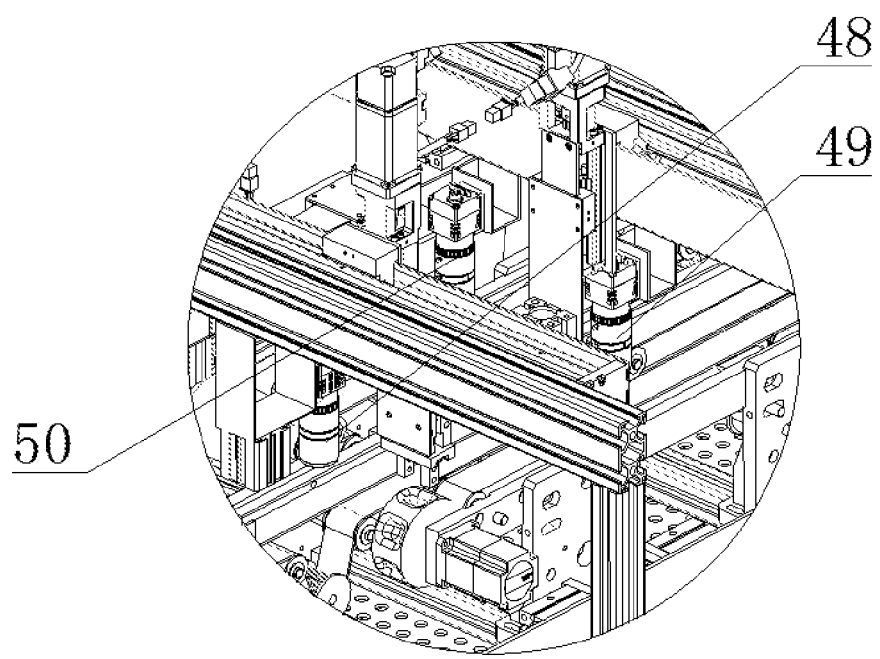
FIG. 8 is a partial enlarged view of a detail portion A in FIG. 7 of the present disclosure.
Figure 9:
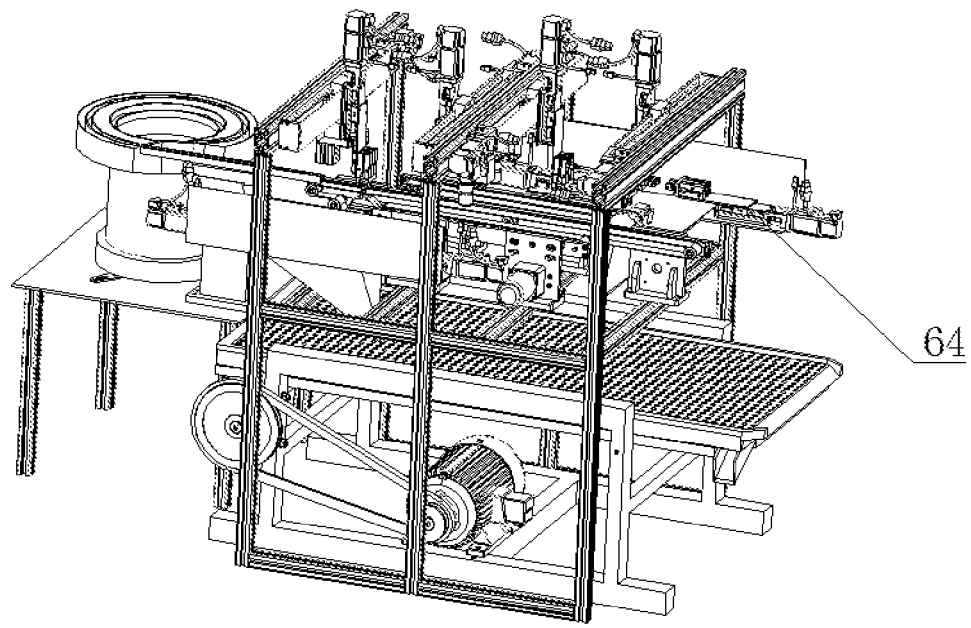
FIG. 9 is a third perspective diagram of the structure according to an embodiment of the present disclosure.
Figure 10:
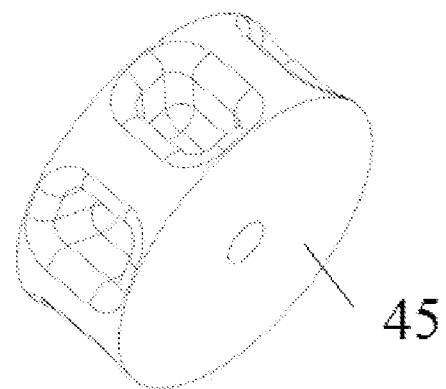
FIG. 10 is a structural diagram of the direction conversion disc of the present disclosure.
Figure 11:
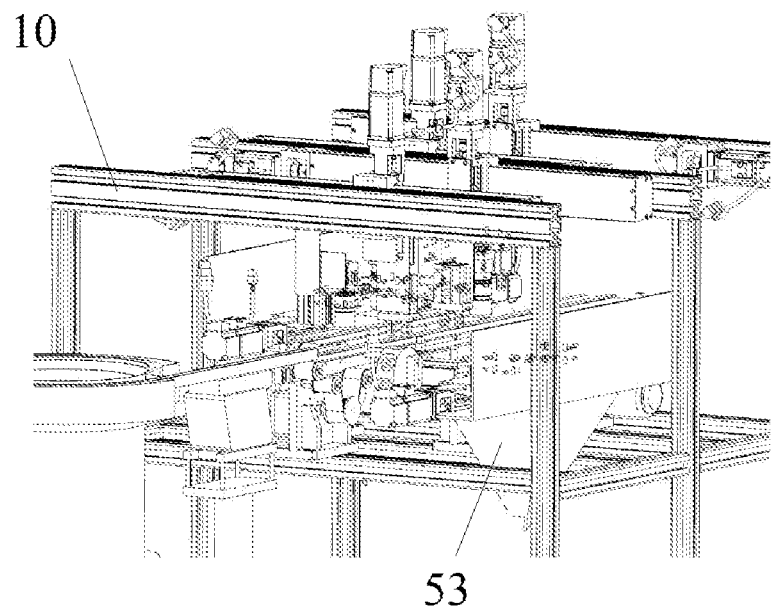
FIG. 11 is a sixth partial structural diagram of the present disclosure
Figure 12:
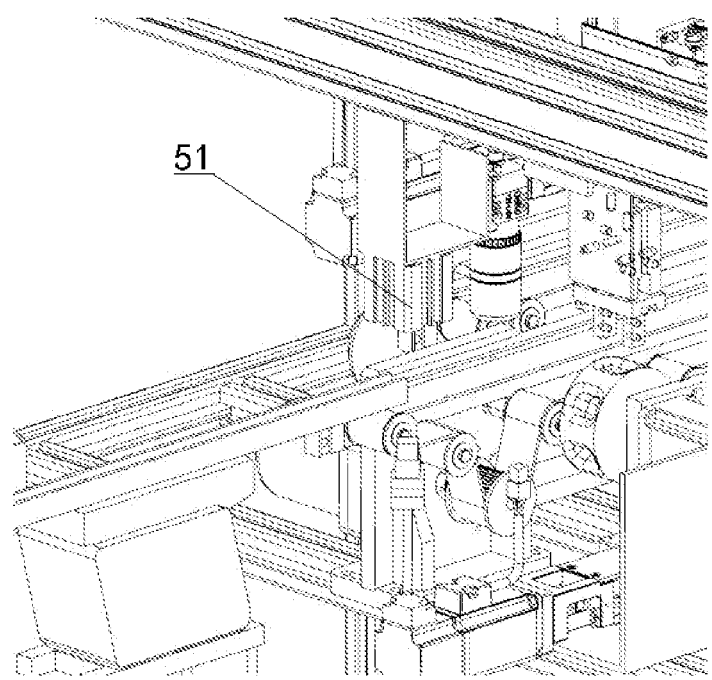
FIG. 12 is a seventh partial structural diagram of the present disclosure.
Figure 13:
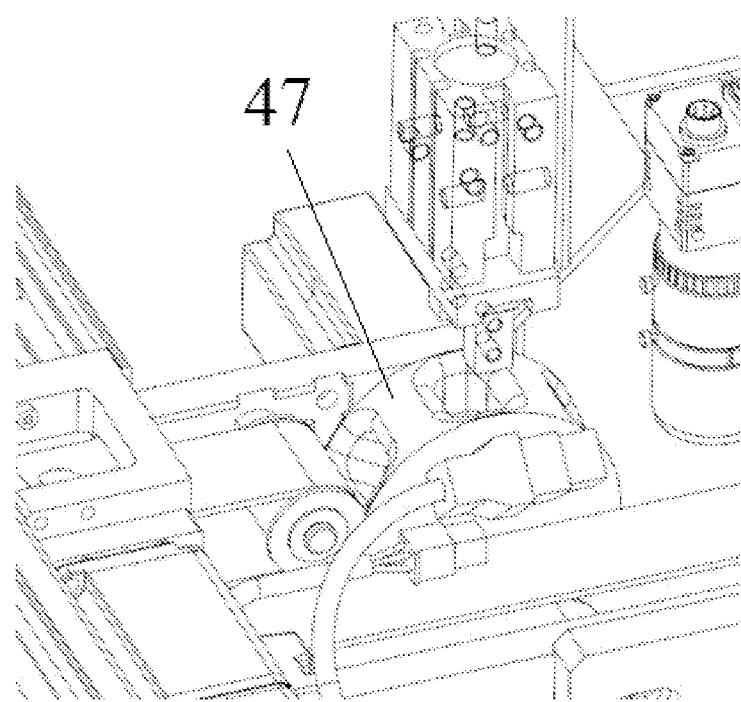
FIG. 13 is an eighth partial structural diagram of the present disclosure.
Figure 14:
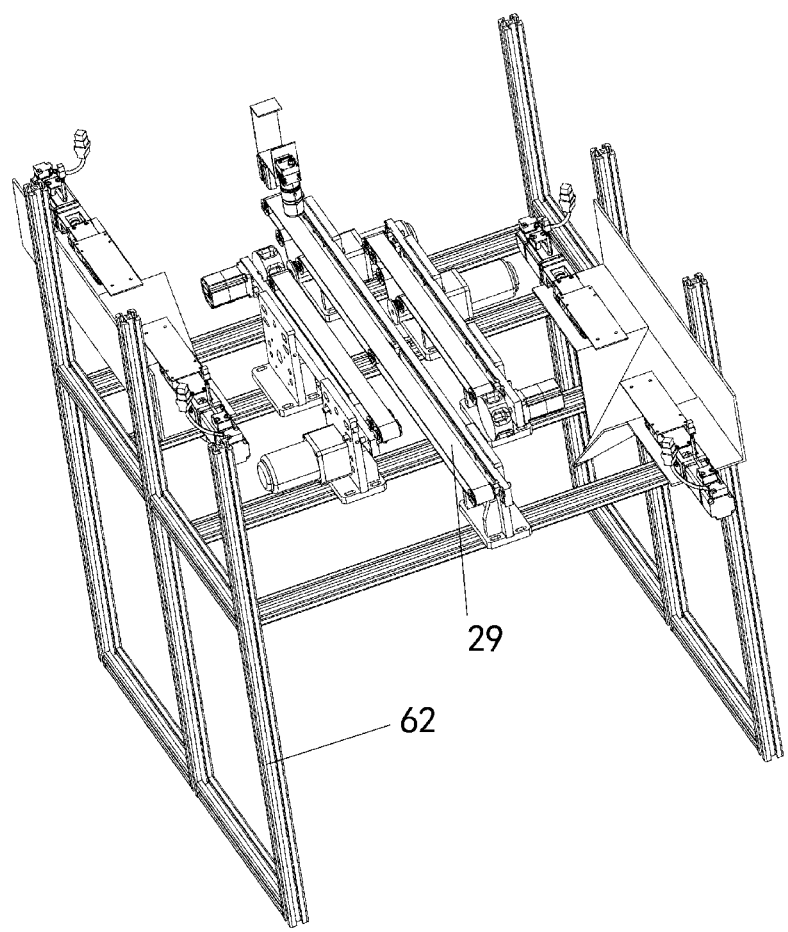
FIG. 14 is a ninth partial structural diagram of the present disclosure.
Figure 15:
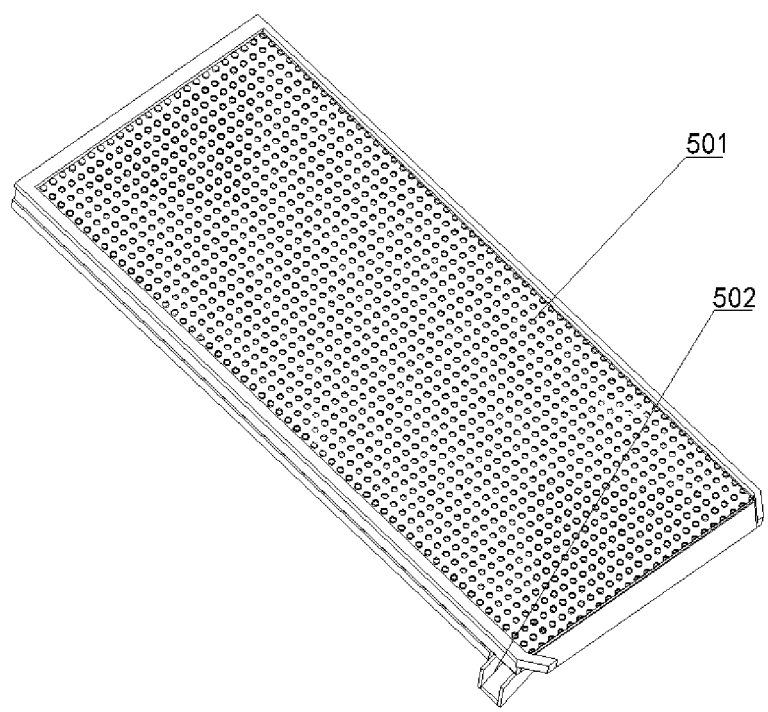
FIG. 15 is a structural diagram of the screening plate of the present disclosure
Figure 16:
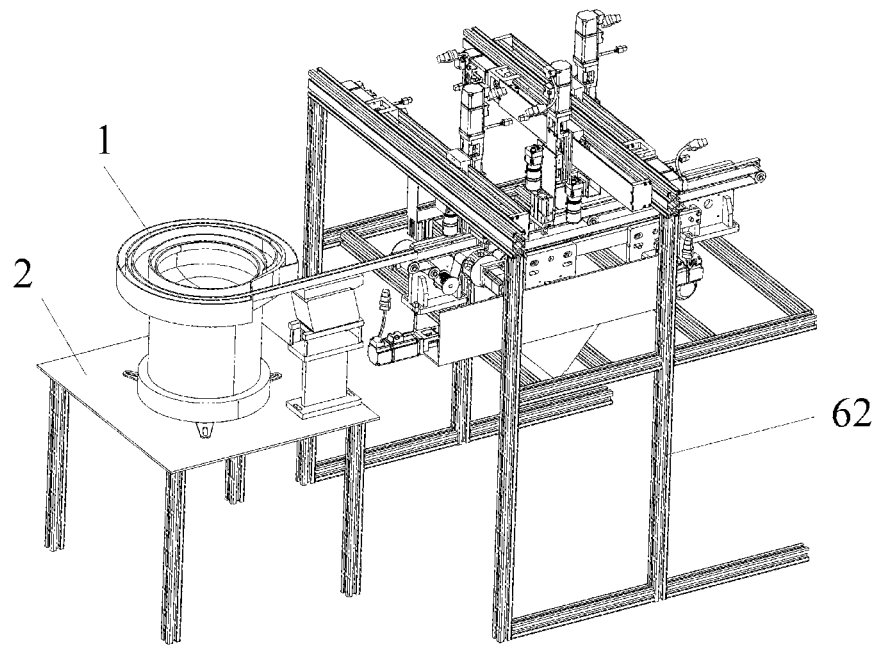
FIG. 16 is a tenth partial structural diagram of the present disclosure.
Figure 17:
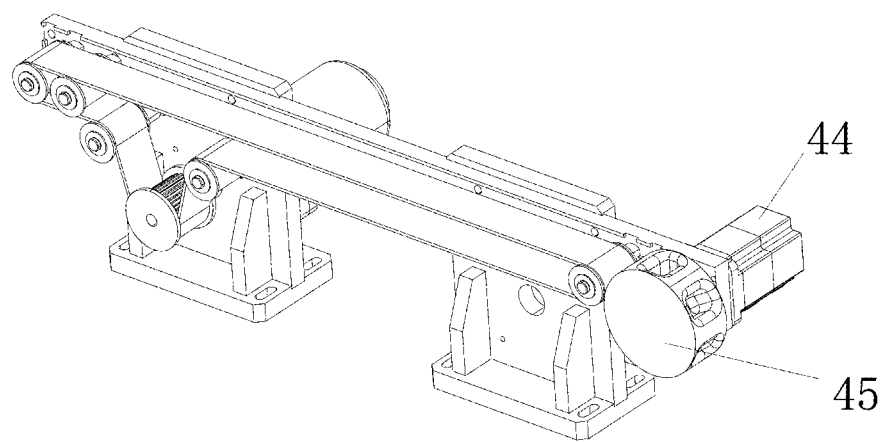
FIG. 17 is an eleventh partial structural diagram of the present disclosure.
Figure 18:
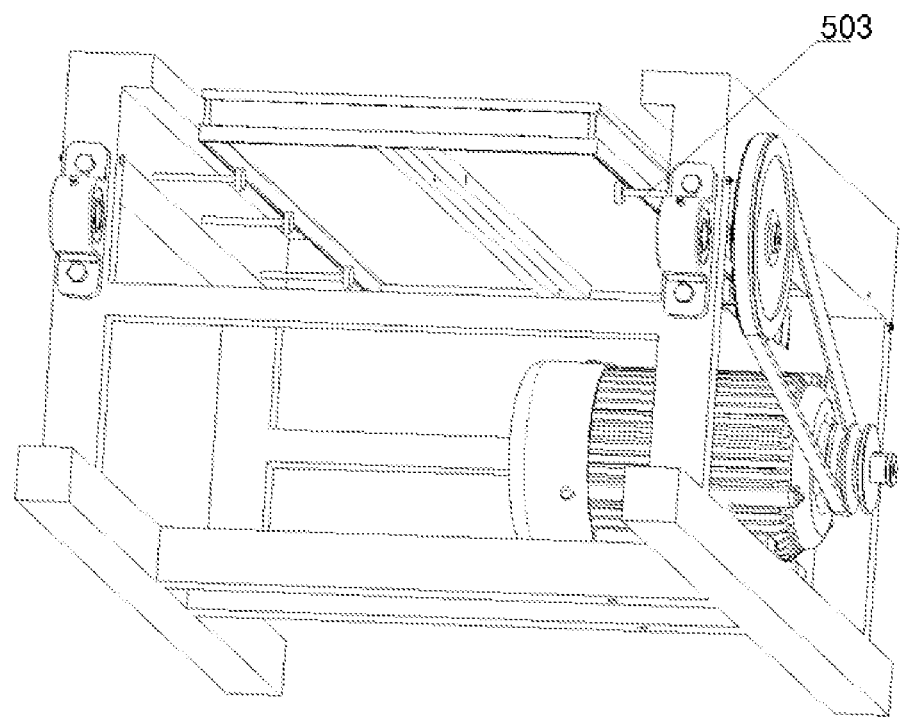
FIG. 18 is a twelfth partial structural diagram of the present disclosure.
Figure 19:
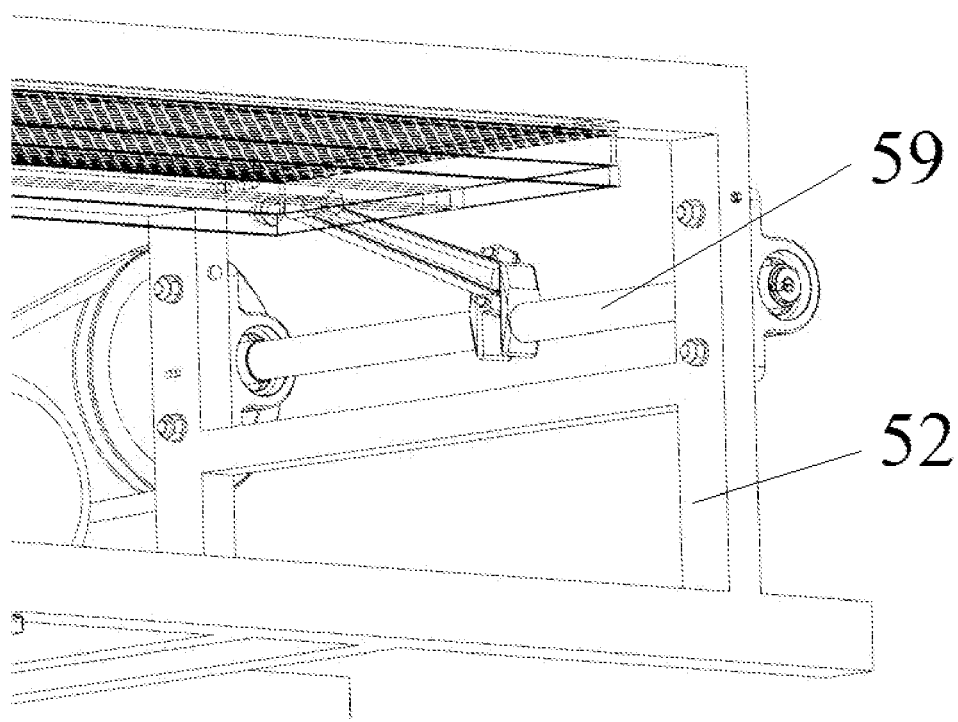
FIG. 19 is a thirteenth partial structural diagram of the present disclosure.
Figure 20:
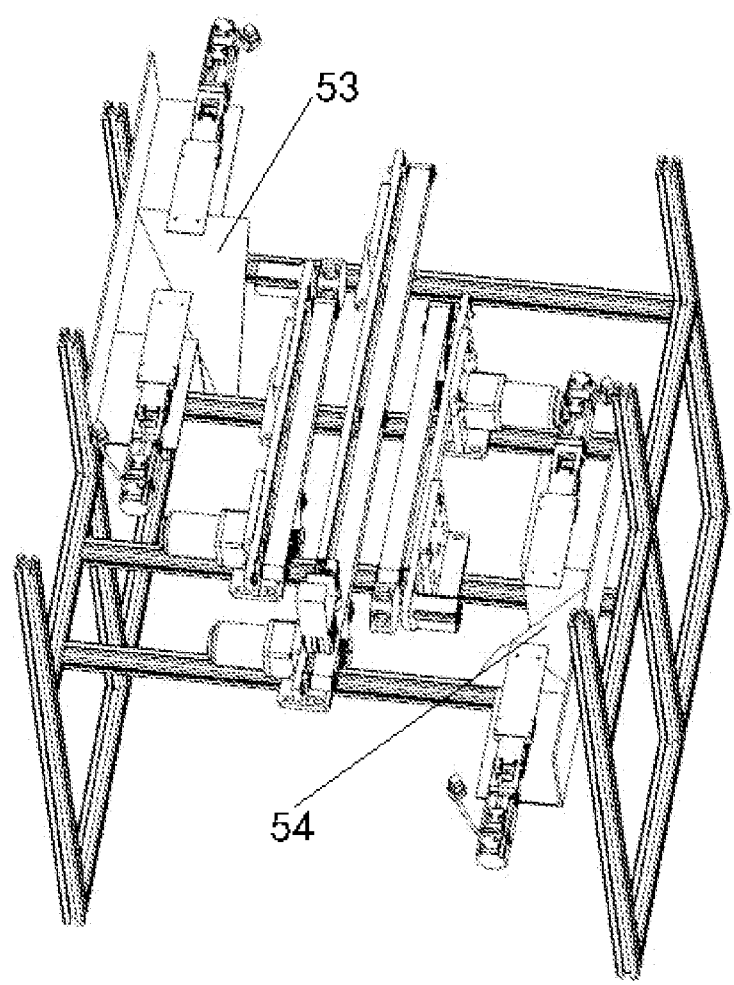
FIG. 20 is a fourteenth partial structural diagram of the present disclosure
Figure 21:
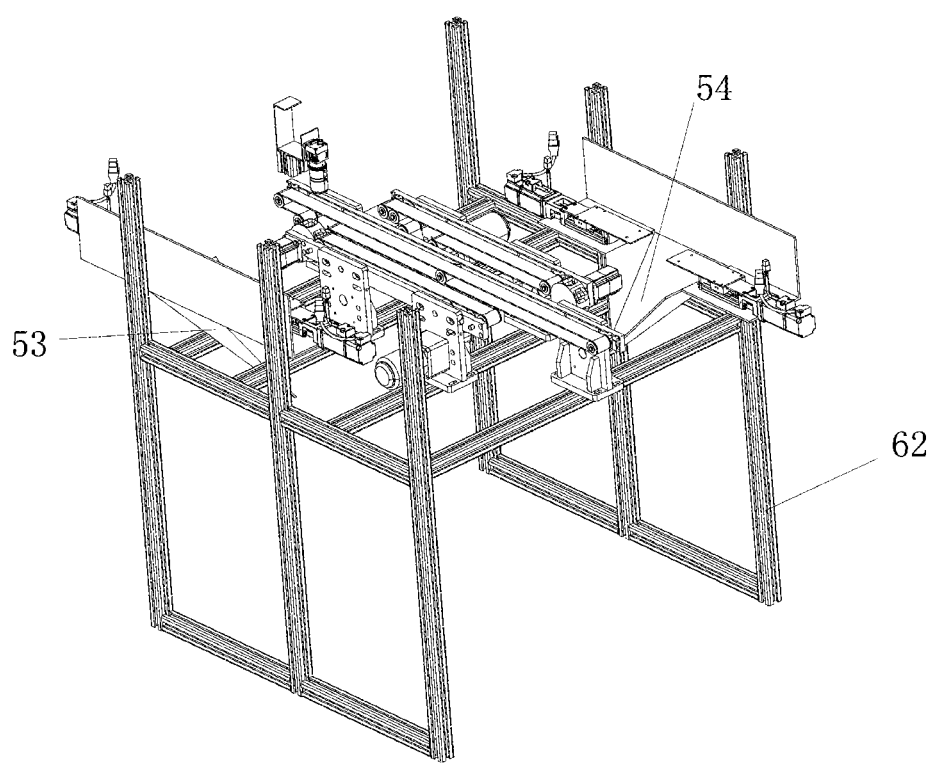
FIG. 21 is a fifteenth partial structural diagram of the present disclosure.

As shown in FIGS. 1-21, the present disclosure includes a processing mechanism, a feeding mechanism and a screening mechanism.

The processing mechanism includes an aluminum profile support bracket 62, a bracket assembly, a conveyor belt device, a conversion device, a sensor device and a cut-off device.

The aluminum profile support bracket 62 is fixedly connected to the bracket assembly.

The bracket assembly includes a first bracket assembly, a second bracket assembly, and a third bracket assembly.

The aluminum profile support bracket 62 is fixedly connected to the conveyor belt device.

The conveyor belt device includes a first conveyor belt assembly, a second conveyor belt assembly, and a third conveyor belt assembly.

The conversion device includes a first direction conversion device and a second direction conversion device.

The bracket assembly is fixedly connected to the sensor device.

The bracket assembly is fixedly connected to the cut-off device.

The screening mechanism is arranged on a lower side of the bracket assembly.

The first bracket assembly includes a first aluminum profile support bracket 3, the aluminum profile support bracket 62 is fixedly connected to the first aluminum profile support bracket 3, and one side of the first aluminum profile support bracket 3 is fixedly connected to a first horizontal single-arm robot 4. A sliding block of the first horizontal single-arm robot 4 is fixedly connected to a first longitudinal single-arm robot 5. A sliding block of the first longitudinal single-arm robot 5 is fixedly connected to a first pneumatic finger 6. An other side of the first aluminum profile support bracket 3 is fixedly connected to a second horizontal single-arm robot 7, and a sliding block of the second horizontal single-arm robot 7 is fixedly connected to a second longitudinal single-arm robot 8. A sliding block of the second longitudinal single-arm robot 8 is fixedly connected to a second pneumatic finger 9. The second bracket assembly includes a second aluminum profile support bracket 10, and the aluminum profile support bracket 62 is fixedly connected to the second aluminum profile support bracket 10. The second aluminum profile support bracket 10 is fixedly connected to a third horizontal single-arm robot 11, and a sliding block of the third horizontal single-arm robot 11 is fixedly connected to a third longitudinal single-arm robot 12. A sliding block of the third longitudinal single-arm robot 12 is fixedly connected to a third pneumatic finger 13. The aluminum profile support bracket 62 is fixedly connected to a first fixed connecting plate 63. A fourth miniature single-arm robot 14 and a fifth miniature single-arm robot 16 are fixedly connected to the first fixed connecting plate 63 and are bilaterally symmetrical. The fourth miniature single-arm robot 14 and the fifth miniature single-arm robot 16 are respectively fixedly connected to a fourth pneumatic finger 15 and a fifth pneumatic finger 17 which are arranged symmetrically. And the third bracket assembly includes a third aluminum profile support bracket 18. The aluminum profile support bracket 62 is fixedly connected to the third aluminum profile support bracket 18. The third aluminum profile support bracket 18 is fixedly connected to a fourth horizontal single-arm robot 19, and a sliding block of the fourth horizontal single-arm robot 19 is fixedly connected to a sixth longitudinal single-arm robot 20. A sliding block of the sixth longitudinal single-arm robot 20 is fixedly connected to a sixth pneumatic finger 21, and the aluminum profile support bracket 62 is fixedly connected to a second fixed connecting plate 64. A seventh miniature single-arm robot 22 and a eighth miniature single-arm robot 24 are fixedly connected to second fixed connecting plate 64 and are arranged symmetrically. The seventh miniature single-arm robot 22 and the eighth miniature single-arm robot 24 are respectively fixedly connected to a seventh pneumatic finger 23 and a eighth pneumatic finger 25 which are arranged symmetrically.

The first conveyor belt assembly includes symmetrically arranged first conveyor belt bases 27, and the aluminum profile support bracket 62 is fixedly connected to the symmetrically arranged first conveyor belt bases 27. Each of the symmetrically arranged first conveyor belt bases 27 is fixedly connected to a first conveyor belt support bracket 26, and one of the first conveyor belt bases 27 is fixedly connected to a first conveyor belt drive motor 31. The first conveyor belt drive motor 31 passes through the one of the first conveyor belt bases 27, and the first conveyor belt drive motor 31 is fixedly connected to a conveyor belt pulley 30. The first conveyor belt support bracket 26 is hinged to a group of first conveyor belt rollers 28, and a first conveyor belt 29 is wound around the group of the first conveyor belt rollers 28 and the first conveyor belt pulley 30. The second conveyor belt assembly includes a symmetrically arranged second conveyor belt bases 33, and the aluminum profile support bracket 62 is fixedly connected to the symmetrically arranged second conveyor belt bases 33. Each of the symmetrically arranged second conveyor belt bases 33 is fixedly connected to a second conveyor belt support bracket 32, and one of the second conveyor belt base 33 is fixedly connected to a second conveyor belt drive motor 37. The second conveyor belt drive motor 37 passes through the one of the second conveyor belt bases 33. The second conveyor belt drive motor 37 is fixedly connected to a second conveyor belt pulley 36. The second conveyor belt support bracket 32 is hinged to a group of second conveyor belt rollers 34, and a second conveyor belt 35 is wound around the group of the second conveyor belt rollers 34 and the second conveyor belt pulleys 36. The third conveyor belt assembly includes a symmetrically arranged third conveyor belt bases 39, and the aluminum profile support bracket 62 is fixedly connected to the symmetrically arranged third conveyor belt bases 39. Each of the symmetrically arranged third conveyor belt bases 39 is fixedly connected to a third conveyor belt support bracket 38, and one of the third conveyor belt bases 39 is fixedly connected to a third conveyor belt drive motor 43. The third conveyor belt drive motor 43 passes through the one of the third conveyor belt bases 39. The third conveyor belt drive motor 43 is fixedly connected to a third conveyor belt pulley 42. The third conveyor belt support bracket 38 is hinged to a group of third conveyor belt rollers 40, and a third conveyor belt 41 is wound around the group of the third conveyor belt rollers 40 and the third conveyor belt pulley 42. Two first conveyor belt bases 27 are respectively fixedly installed on horizontal support rods arranged on two sides of the aluminum profile support bracket 62. Two second conveyor belt bases 33 are respectively fixedly installed on two horizontal support rods arranged on a middle of the aluminum profile support bracket 62. Two third conveyor belt bases 39 are respectively fixedly installed on the two horizontal support rods arranged on a middle of the aluminum profile support bracket 62.

The first direction conversion device includes a first direction conversion motor 44. The second conveyor belt support bracket 32 is fixedly connected to the first direction conversion motor 44, and the output shaft of the first direction conversion motor 44 is fixedly connected to a first direction conversion disc 45. An outer ring of the first direction conversion disc 45 is attached to the second conveyor belt 35. A position of the first direction conversion disc 45 matches a moving direction of the second conveyor belt 35, thus it may catch fell peanuts which follow a movement of the second conveyor belt 35. The second direction conversion device includes a second direction conversion motor 46. The third conveyor belt support bracket 38 is fixedly connected to the second direction conversion motor 46, and an output shaft of the second direction conversion motor 46 is fixedly connected to a second direction conversion disc 47. The second direction conversion disc 47 is attached to the third conveyor belt 41. A position of the second direction conversion disc 47 matches a moving direction of the third conveyor belt 41, thus it may catch fell peanuts which follow movement of the third conveyor belt 41. The first direction conversion disc 45 and the second direction conversion disc 47 have a same structure which is a cylinder with uniformly distributed grooves on surfaces thereof. The peanuts may longitudinally fall into the grooves of the conversion disc along with the movement of the conveyor belt.

The sensor device includes a first camera sensor 48, a second camera sensor 49, and a third camera sensor 50. The second aluminum profile support bracket 10 is fixedly connected to the first camera sensor 48, and the second camera sensor 49 and the third camera sensor 50 are fixedly connected to the first aluminum profile support bracket 3.

The cut-off device is a cut-off cylinder 51, and the second aluminum profile support bracket 10 is fixedly connected to the cut-off cylinder 51. The cut-off cylinder 51 directly faces an outlet of the peanut vibration feeding tray 1.

The middle part of the first fixed connecting plate 63 is provided with a first inclined discharge outlet 53 in the middle thereof, and the second fixed connecting plate 64 is provided with a second inclined discharge outlet 54 in the middle thereof. An opening of a lower side of the first inclined discharge outlet 53 and an opening of a lower side of the second inclined discharge outlet 54 both correspond to a screening plate 55.

The screening mechanism includes a screening device support bracket 52. The screening device support bracket 52 is fixedly connected to a screening device drive motor 56, and the screening device support bracket 52 is fixedly connected to symmetrically arranged bearing seat assemblies 60. An output shaft of the screening device drive motor 56 is fixedly connected to a driving wheel 57. The screening device driving wheel 57 is connected to a screening device driven wheel 58 via a belt. Each of the symmetrically arranged bearing seat assemblies 60 is hinged to a crank connecting shaft 59, and the crank connecting shaft 59 is fixedly connected to the screening device driven wheel 58. An outer side of an inflection point of the crank connecting shaft 59 is sleeved on one end of the reciprocating connecting rod 61, and an other end of the reciprocating connecting rod 61 is hinged to an end of bottom of a screening plate 55. A group of evenly distributed circular holes 501 are provided on an upper side of the screening plate 55. The circular holes 501 are communicated with an internal cavity of the screening plate 55. One end of the screening plate 55 is fixedly connected to a discharge port 502 which is communicated with the internal cavity of the screening plate 55.

The inner sides of two vertical plates of the screening device support bracket 52 are each fixedly connected with a group of evenly distributed circular supporting rods 503, and a lower side of the screening plate 55 is attached to the circular supporting rods 503.

The feeding mechanism includes a peanut vibrating feeding tray 1 and a peanut vibrating feeding tray supporting bracket 2 which is fixedly connected to the peanut vibrating feeding tray 1.

The present disclosure includes the following steps.

In step 1, peanuts are put into the peanut vibration feeding tray 1.

In step 2, the controller controls the vibration of the peanut vibrating feed tray 1 and sends the peanuts from the circular track of the peanut vibrating feed tray 1 to the discharge port of the peanut vibrating feed tray 1 sequentially.

In step 3, the controller controls the cut-off cylinder 51. When the telescopic shaft of the cut-off cylinder 51 retracts, the discharge port of the peanut vibrating feeding tray 1 is no longer blocked, and the peanuts enter the first conveyor belt 29.

In step 4, the first camera sensor 48 detects the sizes, shapes and positions of the peanuts on the first conveyor belt 29 and transmits the data to the controller, and the controller controls subsequent components to perform corresponding actions.

In step 5, the controller determines whether the peanuts are suitable to be used as seeds, when the detected peanuts are suitable to be used as seeds and the heads of the peanuts are towards a moving direction of the first conveyor belt 29, then the controller controls the first horizontal single-arm robot, the first longitudinal single-arm robot 5 and the first pneumatic finger 6 of the first bracket assembly 4 to grab peanuts onto the second conveyor belt 35.

In step 6, the second camera sensor 49 detects the positions and states of the peanuts on the second conveyor belt 35 which move in an opposite direction to the first conveyor belt 29.

In step 7, the data is transmitted to the controller after the peanuts on the second conveyor belt 35 have reached the predetermined position which is detected by the second camera sensor 49. The peanuts follow the second conveyor belt 35 to move to the end thereof and fall longitudinally into the groove of the first direction conversion disc 45. The first direction conversion motor 44 drives the first direction conversion disc 45 to rotate, so that the peanuts are changed from a horizontal state to a vertical state, and then the first direction conversion motor 44 is stopped.

In step 8, the third horizontal single-arm robot 11 and the third longitudinal single-arm robot 12 drive the third pneumatic finger 13 to move to the position corresponding to the vertical peanuts. The third pneumatic finger 13 grabs the peanuts and applies a clamping force to the peanuts to form small openings thereon. The third horizontal single-arm robot 11 drives the third pneumatic finger 13 to move towards the direction of the fourth pneumatic finger 15 and the fifth pneumatic finger 17, and the third pneumatic finger 13 may reach the predetermined position. Each of the fourth pneumatic finger 15 and the fifth pneumatic finger 17 moves by the driving of a miniature single-arm robot which is connected to the fourth pneumatic finger 15 and the fifth pneumatic finger 17. Each of the fourth pneumatic finger 15 and the fifth pneumatic finger 17 grabs a corresponding side of a peanut, and moves in an opposite direction to divide the peanut shell into two parts.

In step 9, the divided peanut seeds and the peanut shells fall into the screening mechanism through the first inclined discharge outlet 53, the peanut seeds and the peanut shells are separated by the movement of the screening plate 55, and the peanut seeds are collected to achieve the desired effect.

In step 10, when the detected peanuts are suitable to be used as seeds and heads of the peanuts are towards a moving direction which is opposite to the moving direction of the first conveyor belt 29. The second single-arm robot 7, the second miniature single-arm robot 8 and the second pneumatic finger 9 of the first bracket assembly are controlled to grab the peanuts onto the third conveyor belt 41, and the unqualified peanuts follow the movement of the first conveyor belt 29 and fall off.

In step 11, the third camera sensor 50 detects the positions and states of the peanuts on the third conveyor belt 41 which move in the same direction as the first conveyor belt 29.

In step 12, the data is transmitted to the controller after the peanuts on the third conveyor belt 41 have reached the predetermined position which is detected by the third camera sensor 50. The peanuts follow the third conveyor belt 41 to move to the end thereof and fall longitudinally into the groove of the second direction conversion disc 47. The controller controls the second direction conversion motor 46 to drive the second direction conversion disc 47 to move, so that the peanuts are changed to the vertical state, and the second direction conversion motor 46 is stopped In step 13, the fourth horizontal single-arm robot 19 and the sixth longitudinal single-arm robot 20 drive the sixth pneumatic finger 21 to move to the position corresponding to the vertical peanuts. The sixth pneumatic finger 21 grabs the peanuts and applies the clamping force to the peanuts to form small openings thereon. The fourth horizontal single-arm robot 19 drives the sixth pneumatic finger 21 to move towards the direction of the seventh pneumatic finger 23 and the eighth pneumatic finger 25, and the sixth pneumatic finger 21 may reach the predetermined position. Each of the seventh pneumatic finger 23 and the eighth pneumatic finger 25 moves by the driving of a miniature single-arm robot which is connected to the seventh pneumatic finger 23 and the eighth pneumatic finger 25. Each of the seventh pneumatic finger 23 and the eighth pneumatic finger 25 grabs a corresponding side of a peanut, and moves in an opposite direction to divide the peanut shell into two parts.

In step 14, the peanut seeds and the peanut shells after being separated fall into the screening mechanism through the second cutting inclined outlet 54, the peanut seeds and the peanut shells are separated by the movement of the screening plate 55, and the peanut seeds are collected to achieve the desired effect.

The screening device drive motor 56 drives the screening device drive wheel 57 to rotate, and the screening device drive wheel 57 drives the screening device driven wheel 58 to rotate via a belt. The screening device driven wheel 58 drives the crank connecting shaft 59 to rotate, and the crank connecting shaft 59 drives one end of the reciprocating connecting rod 61 to reciprocate. An other end of the reciprocating connecting rod 61 drives the screening plate 55 to move back and forth on the circular supporting rod 503. The peanut seeds may fall from the circular hole 501 into the cavity of the screening plate 55 and may fall from the discharge port 502 into a material box which is placed below the discharge port 502.

The model of the first horizontal single-arm robot 4 is a mobile component of HIWIN (HI-tech WINner) KK605P500A1F2CS2M.

The model of the first longitudinal single-arm robot 5 is a mobile component of HIWIN KK401P100A1F2CS2M.

The model of the second horizontal single-arm robot 7 is a mobile component of HIWIN KK605P500A1F2CS2M.

The model of the second longitudinal single-arm robot 8 is a mobile component of HIWIN KK401P100A1F2CS2M.

The model of the third horizontal single-arm robot 11 is a mobile component of HIWIN KK605P500A1F2CS2M.

The model of the third longitudinal single-arm robot 12 is a mobile component of HIWIN KK401P100A1F2CS2M.

The model of the fourth miniature single-arm robot 14 is a mobile component of HIWIN KK401P100A1F2CS2M.

The model of the fifth miniature single-arm robot 16 is a mobile component of HIWIN KK401P100A1F2CS2M.

The model of the fourth horizontal single-arm robot 19 is a mobile component of HIWIN KK605P500A1F2CS2M.

The model of the sixth longitudinal single-arm robot 20 is a mobile component of HIWIN KK401P100A1F2CS2M.

The model of the seventh miniature single-arm robot 22 is a mobile component of HIWIN KK401P100A1F2CS2M.

The model of the eighth mini-single-arm robot 24 is a mobile component of HIWIN KK401P100A1F2CS2M.

The models of first pneumatic finger 6, the second pneumatic finger 9, the third pneumatic finger 13, the fourth pneumatic finger 15, the fifth pneumatic finger 17, the sixth pneumatic finger 21, the seventh pneumatic finger 23, and the eighth pneumatic finger 25 are AirTAC MHZ220D.

The model of the first conveyor belt drive motor 31 is a 57 high-speed closed-loop stepper motor.

The model of the second conveyor belt drive motor 37 is a 57 high-speed closed-loop stepper motor.

The model of the third conveyor belt drive motor 43 is a 57 high-speed closed-loop stepper motor.

The model of the first direction conversion motor 44 is a 42 high-speed closed-loop stepper motor.

The model of the second direction conversion motor 46 is a 42 high-speed closed-loop stepper motor.

The models of the first camera sensor 48, the second camera sensor 49, and the third camera sensor 50 are high-definition drive-free 8 million autofocus industrial cameras. The model of the end cylinder 51 is an AirTAC ACQ80*5 cylinder. The model of the screening device driving motor 56 is a YL single-phase and 220V high-horsepower motor, and the model of the peanut vibrating feeding tray 1 is a SHEFFIELD/steel shield vibrating feeder.

The peanut vibrating feeding tray 1, the first horizontal single-arm robot 4, the first longitudinal single-arm robot 5, the first pneumatic finger 6, the second horizontal single-arm robot 7, the second Longitudinal single-arm robot 8, the second pneumatic finger 9, the third horizontal single-arm robot 11, the third longitudinal single-arm robot 12, the third pneumatic finger 13, the fourth miniature single-arm robot 14, the fourth pneumatic finger 15, the fifth miniature single-arm robot 16, the fifth pneumatic finger 17, the fourth horizontal single-arm robot 19, the sixth longitudinal single-arm robot 20, the sixth pneumatic finger 21, the seventh miniature single arm robot 22, the seventh pneumatic finger 23, the eighth miniature single-arm robot 24, the eighth pneumatic finger 25, the first conveyor belt drive motor 31, the second conveyor belt drive motor 37, the third conveyor belt drive motor 43, the first direction conversion motor 44, the second direction conversion motor 46, the first camera sensor 48, the second camera sensor 49, the third camera sensor 50, the cut-off cylinder 51, and the screening device drive motor 56 are all connected to the controller. The controller is a single-chip microcomputer STM32F407ZET6. The control part uses an existing technology that is not repeatedly described here.

The first camera sensor 48 is located above the first conveyor belt assembly, and detects the sizes and positions of the peanuts on the first conveyor belt 29. The second camera sensor 49 is located above the second conveyor belt assembly, and detects the positions of the peanuts on the second conveyor belt assembly. The third camera sensor 50 is located above the third conveyor belt assembly, and detects the positions of the peanuts on the third conveyor belt assembly. The cut-off cylinder 51 is located at the junction of the outlet of the peanut vibration feeding tray and the first conveyor belt assembly.

The working process of the present disclosure is as follows. Peanuts are put into the peanut vibrating feeding tray 1, and the controller is turned on. The controller controls the peanut vibrating feeding tray 1 to vibrate, and the peanuts are sent from the circular track of the peanut vibrating feeding tray 1 to a discharge port of the peanut vibrating feed tray 1 sequentially. The controller controls the cut-off cylinder 51. When the telescopic shaft of the cut-off device 51 retracts, the discharge port of the peanut vibrating feeding tray 1 is no longer blocked, and the peanuts enter the first conveyor belt 29.

The controller controls the first conveyor belt drive motor 31, the second conveyor belt drive motor 37, and the third conveyor belt drive motor to start. The first conveyor belt drive motor 31 drives the first conveyor belt pulley 30 to rotate, the first conveyor belt pulley 30 drives the first conveyor belt 29 to move, and the conveyor belt 29 drives the first conveyor belt roller 28 to rotate. The second conveyor belt drive motor 37 drives the second conveyor belt pulley 36 to rotate, the second conveyor belt pulley 36 drives the second conveyor belt 35 to move, and the second conveyor belt 35 drives the second conveyor belt roller 34 to rotate. The third conveyor belt drive motor 43 drives the third conveyor belt pulley 42 to rotate, the third conveyor belt pulley 42 drives the third conveyor belt 41 to move, and the third conveyor belt 41 drives the third conveyor belt roller 40 to rotate.

The peanuts are fallen on the first conveyor belt 29 and moved by the drive of the first conveyor belt 29.

The first camera sensor 48 detects the sizes, shapes and positions of the peanuts on the first conveyor belt 29 and transmits the data to the controller, and the controller controls the subsequent components to perform corresponding actions.

When the first camera sensor 48 detects that the peanuts are suitable to be used as seeds and the heads of the peanuts are towards the moving direction of the first conveyor belt 29, then the first pneumatic finger 6 grabs the peanuts onto the second conveyor belt 35. The second camera sensor 49 detects the positions and states of the peanuts on the second conveyor belt 35 which move in the opposite direction to the first conveyor belt 29. After the second camera sensor 49 detects that the peanuts on the second conveyor belt 35 have reached the predetermined position, the data is transmitted to the controller to control the first direction conversion motor 44, so as to drive the first direction conversion disc 45 to move. The peanuts may fall longitudinally into the groove of the first direction conversion disc 45, and the first direction conversion motor 44 drives the first direction conversion disc 45 to rotate, so that the peanuts may move to be the vertical state along with the rotation of the first direction conversion disc 45. The third horizontal single-arm robot 11 drives the third longitudinal single-arm robot 12 to move in the horizontal direction, and the third longitudinal single-arm robot 12 drives the third pneumatic finger 13 to move in the vertical direction, so that the third pneumatic finger 13 is enabled to move horizontally and vertically. The fourth miniature single-arm robot 14 may drive the fourth pneumatic finger 15 to move horizontally, and the fifth miniature single-arm robot 16 may drive the fifth pneumatic finger 17 to move horizontally. The third pneumatic finger 13 grabs peanuts and moves towards the fourth pneumatic finger 15 and the fifth pneumatic finger 17, and reach the predetermined position. Each of the fourth pneumatic finger 15 and the fifth pneumatic finger 17 grabs a corresponding side of a peanut and move in an opposite direction at the same time to separate the peanut seed from the peanut shell. The peanut seeds and the peanut shells after being separated fall onto the screening plate 55 through the first inclined discharge outlet 53.

When the first camera sensor 48 detects that the peanuts are suitable to be used as seeds and the heads of the peanuts are towards the moving direction which is opposite to the moving direction of the direction of the first conveyor belt 29, the second pneumatic finger 9 grabs the peanuts onto the third conveyor belt 41. The third camera sensor 50 detects the positions and states of the peanuts on the third conveyor belt 41 which move in the same direction as the first conveyor belt 29. After the third camera sensor 50 detects that the peanuts on the third conveyor belt 41 have reached the predetermined position, the data is transmitted to the controller. The peanuts may fall longitudinally into the groove of the second direction conversion disc 47, and the second direction conversion motor 46 is controlled to drive the second direction conversion disc 47 to rotate, so that the peanuts may move to be the vertical state. The fourth horizontal single-arm robot 19 drives the sixth vertical single-arm robot 20 to move in the horizontal direction, and the sixth longitudinal single-arm robot 20 drives the sixth pneumatic finger 21 to move in the vertical direction, so that the sixth pneumatic finger 21 is enabled to move horizontally and vertically. The seventh miniature single-arm robot 22 may drive the seventh pneumatic finger 23 to move horizontally, and the eighth miniature single-arm robot 24 may drive the eighth pneumatic finger 25 to move horizontally. The sixth pneumatic finger 21 grabs peanuts and moves towards the seventh pneumatic finger 23 and the eighth pneumatic finger 25, and reaches the predetermined position. Each of the seventh pneumatic finger 23 and the eighth pneumatic finger 25 grabs a corresponding side of a peanut, and moves in an opposite direction at the same time to separate the peanut seed from the peanut shell. The peanut seeds and peanut shells after being separated fall onto the screening plate 55 through the second inclined discharge outlet 54.

The controller controls the screening device drive motor 56 to start. The screening device drive motor 56 drives the screening device drive wheel 57 to rotate, and the screening device drive wheel 57 drives the screening device driven wheel 58 to rotate via the belt. The screening device driven wheel 58 drives the crank connecting shaft 59 to rotate, and the crank connecting shaft 59 drives the reciprocating connecting rod 61 to reciprocate, and the reciprocating connecting rod 61 drives the screening plate 55 to move back and forth. The peanut seeds may fall from the circular hole 501 of a upper layer of the screening plate 55 into the cavity of the screening plate 55, and may fall out of the discharge port 502 of the screening plate 55. The peanut shells may fall out of one side of the screening plate 55. The peanut seeds may be separated from the peanut shells by the movement of the screening plate 55, and then the peanut seeds may be collected to achieve the desired effect.

The above disclosure is merely a specific embodiment of the present disclosure, but the present disclosure is not limited thereto, and any variation that can be conceived by those skilled in the art should belong to the scope of protection of the present disclosure.

What is claimed is:
1. A fully automatic peanuts peeling robot for seeds retention, the fully automatic peeling robot comprising a processing mechanism, a feeding mechanism and a screening mechanism, wherein
the processing mechanism comprises an aluminum profile support bracket, a bracket assembly, a conveyor belt device, a conversion device, a sensor device and a cut-off device;
the aluminum profile support bracket is fixedly connected to the bracket assembly;
the bracket assembly comprises a first aluminum profile support bracket, a second aluminum profile support bracket, and a third aluminum profile support bracket;
the aluminum profile support bracket is fixedly connected to the conveyor belt device;
the conveyor belt device comprises a first conveyor belt assembly, a second conveyor belt assembly, and a third conveyor belt assembly;
the conversion device comprises a first direction conversion device and a second direction conversion device;
the bracket assembly is fixedly connected to the sensor device;
the bracket assembly is fixedly connected to the cut-off device;
the screening mechanism is arranged on a lower side of the bracket assembly;
wherein the aluminum profile support bracket is fixedly connected to the first aluminum profile support bracket, one side of the first aluminum profile support bracket is fixedly connected to a first horizontal single-arm robot, a sliding block of the first horizontal single-arm robot is fixedly connected to a first longitudinal single-arm robot, a sliding block of the first longitudinal single-arm robot is fixedly connected to a first pneumatic finger, and another side of the first aluminum profile support bracket is fixedly connected to a second horizontal single-arm robot, and a sliding block of the second horizontal single-arm robot is fixedly connected to a second longitudinal single-arm robot, a sliding block of the second longitudinal single-arm robot is fixedly connected to a second pneumatic finger;
wherein the aluminum profile support bracket is fixedly connected to the second aluminum profile support bracket, the second aluminum profile support bracket is fixedly connected to a third horizontal single-arm robot, and a sliding block of the third horizontal single-arm robot is fixedly connected to a third longitudinal single-arm robot, a sliding block of the third longitudinal single-arm robot is fixedly connected to a third pneumatic finger, the aluminum profile support bracket is fixedly connected to a first fixed connecting plate, a fourth miniature single-arm robot and a fifth miniature single-arm robot are fixedly connected to the first fixed connecting plate and are arranged symmetrically, the fourth miniature single-arm robot and the fifth miniature single-arm robot are respectively fixedly connected to a fourth pneumatic finger and a fifth pneumatic finger which are arranged symmetrically; and
wherein the aluminum profile support bracket is fixedly connected to the third aluminum profile support bracket, and the third aluminum profile support bracket is fixedly connected to a fourth horizontal single-arm robot, and a sliding block of the fourth horizontal single-arm robot is fixedly connected to a sixth longitudinal single-arm robot, a sliding block of the sixth longitudinal single-arm robot is fixedly connected to a sixth pneumatic finger, and the aluminum profile sup- port bracket is fixed connected to a second fixed connecting plate, a seventh miniature single-arm robot and a eighth miniature single-arm robot are fixedly connected to the second fixed connecting plate and are arranged symmetrically, the seventh miniature single-arm robot and the eighth miniature single-arm robot are respectively fixedly connected to a seventh pneumatic finger and a eighth pneumatic finger.

2. The fully automatic peanuts peeling robot for seeds retention according to claim 1, wherein the first conveyor belt assembly comprises symmetrically arranged first conveyor belt bases, the aluminum profile support bracket is fixedly connected to the symmetrically arranged first conveyor belt bases, each of the symmetrically arranged first conveyor belt bases is fixedly connected to a first conveyor belt support bracket, and one of the first conveyor belt bases is fixedly connected to a first conveyor belt drive motor, the first conveyor belt drive motor passes through the one of the first conveyor belt bases, the first conveyor belt drive motor is fixedly connected to a first conveyor belt pulley, the first conveyor belt support bracket is hinged to a group of first conveyor belt rollers, and a first conveyor belt is wound around the group of the first conveyor belt rollers and the first conveyor belt pulley;

the second conveyor belt assembly comprises symmetrically arranged second conveyor belt bases, the aluminum profile support bracket is fixedly connected to the symmetrically arranged second conveyor belt bases, each of the symmetrically arranged second conveyor belt bases is fixedly connected to a second conveyor belt support bracket, and one of the second conveyor belt bases is fixedly connected to a second conveyor belt drive motor, and the second conveyor belt drive motor passes through the one of the second conveyor belt bases, the second conveyor belt drive motor is fixedly connected to a second conveyor belt pulley, the second conveyor belt support bracket is hinged to a group of second conveyor belt rollers, a second conveyor belt is wound around the group of the second conveyor belt rollers and the second conveyor belt pulley;

the third conveyor belt assembly comprises a symmetrically arranged third conveyor belt bases, the aluminum profile support bracket is fixedly connected to the symmetrically arranged third conveyor belt bases , each of the symmetrically arranged third conveyor belt bases is fixedly connected to a third conveyor belt support bracket, and one of the third conveyor belt bases is fixedly connected to a third conveyor belt drive motor, the third conveyor belt drive motor passes through the one of the third conveyor belt bases, the third conveyor belt drive motor is fixedly connected to a third conveyor belt pulley, the third conveyor belt support bracket is hinged to a group of third conveyor belt rollers, and a third conveyor belt is wound around the group of the third conveyor belt rollers and the third conveyor belt pulley.

3. The fully automatic peanuts peeling robot for seeds retention according to claim 2, wherein the first direction conversion device comprises a first direction conversion motor, the second conveyor belt support bracket is fixedly connected to the first direction conversion motor, an output shaft of the first direction conversion motor is fixedly connected to a first direction conversion disc; and the second direction conversion device comprises a second direction conversion motor, the third conveyor belt support bracket is fixedly connected to the second direction conversion motor, and an output shaft of the second direction conversion motor is fixedly connected to a second direction conversion disc.

4. The fully automatic peanuts peeling robot for seeds retention according to claim 1, wherein the sensor device comprises a first camera sensor, a second camera sensor and a third camera sensor, the second aluminum profile support bracket is fixedly connected to the first camera sensor, and the second camera sensor and the third camera sensors are fixedly connected to the first aluminum profile support bracket.

5. The fully automatic peanuts peeling robot for seeds retention according to claim 2, wherein the cut-off device is a cut-off cylinder, and the second aluminum profile support bracket is fixedly connected to the cut-off cylinder.

6. The fully automatic peanuts peeling robot for seeds retention according to claim 5, wherein the first fixed connecting plate is provided with a first inclined discharge outlet in a middle thereof, and the second fixed connecting plate is provided with a second inclined discharge outlet in a middle thereof.

7. The fully automatic peanuts peeling robot for seeds retention according to claim 1, wherein the screening mechanism comprises a screening device support bracket, and the screening device support bracket is fixedly connected to a screening device drive motor, the screening device support bracket is fixedly connected to symmetrically arranged bearing seat assemblies, an output shaft of the screening device drive motor is fixedly connected to a screening device driving wheel, the screening device driving wheel is connected to a screening device driven wheel via a belt, each of the symmetrically arranged bearing seat assemblies is hinged to a crank connecting shaft, and the crank connecting shaft is fixedly connected to the screening device driven wheel, an outer side of an inflection point of the crank connecting shaft is sleeved on one end of a reciprocating connecting rod, and another end of the reciprocating connecting rod is hinged to an end of a bottom of a screening plate, inner sides of two vertical plates of the screening device support bracket are each fixedly connected with a group of evenly distributed circular support rods, and a lower side of the screening plate is in contact with the circular support rods.

8. The fully automatic peanuts peeling robot for seeds retention according to claim 1, wherein the feeding mechanism comprises a peanut vibrating feeding tray and a peanut vibrating feeding tray support bracket which are fixedly connected with each other.

9. A peeling method using the fully automatic peanuts peeling robot for seeds retention according to claim 1, the method comprising:
putting the peanuts into a peanut vibration feeding tray of the fully automatic peeling robot;
controlling the peanut vibrating feed tray to vibrate by a controller connected to the peanut vibrating feed tray, and sending the peanuts from a circular track of the peanut vibrating feed tray to a discharge port of the peanut vibrating feed tray sequentially;
controlling a cut-off cylinder of the fully automatic peeling robot by the controller connected to the cut-off cylinder, and when a telescopic shaft of the cut-off cylinder retracts, enabling the discharge port of the peanut vibrating feeding tray to not be blocked, and the peanuts to enter a first conveyor belt of the fully automatic peeling robot;
detecting sizes, shapes and positions of the peanuts on the first conveyor belt by a first camera sensor of the sensor device, transmitting first data to the controller, and controlling subsequent components to perform corresponding actions by the controller;

determining whether the peanuts are suitable to be used as seeds by the controller, when the peanuts after being detected are suitable to be used as seeds and heads of first ones of the peanuts are towards a moving direction of the first conveyor belt, controlling a first horizontal single-arm robot of the fully automatic peeling robot, a first longitudinal single-arm robot of the fully automatic peeling robot and a first pneumatic finger of the first bracket assembly to grab the first ones of the peanuts onto a second conveyor belt of the fully automatic peeling robot;

detecting positions and states of the first ones of the peanuts on the second conveyor belt by a second camera sensor of the sensor device, wherein the second conveyor belt moves in an opposite direction to the first conveyor belt;

transmitting second data to the controller after detecting that the first ones of the peanuts on the second conveyor belt reach a first predetermined position, enabling the first ones of the peanuts follow the second conveyor belt to move to an end of the second conveyor belt and fall longitudinally into a groove of a first direction conversion disc of the conversion device, driving the first direction conversion disc to rotate by a first direction conversion motor of the conversion device to change the first ones of the peanuts from a horizontal state to a vertical state, and stopping the first direction conversion motor;

moving a third pneumatic finger of the fully automatic peeling robot, by a third horizontal single-arm robot and a third longitudinal single-arm robot of the fully automatic peeling robot, to a position corresponding to the first ones of the peanuts that are in the vertical state, grabbing the first ones of the peanuts by the third pneumatic finger and applying a clamping force to the first ones of the peanuts to form small openings thereon; driving the third pneumatic finger to move towards a fourth pneumatic finger and a fifth pneumatic finger of the fully automatic peeling robot by the third horizontal single-arm robot, and enabling the third pneumatic finger to reach a second predetermined position; moving each of the fourth pneumatic finger and the fifth pneumatic finger by a respective connected miniature single-arm robot of the fully automatic peeling robot, enabling each of the fourth pneumatic finger and the fifth pneumatic finger to grab a corresponding side of one of the first ones of the peanuts, and to move in an opposite direction simultaneously, so as to divide a shell of the one of the first ones of the peanuts into two parts;

enabling a seed and the shell of each of the first ones of the peanuts after dividing to fall into the screening mechanism through a first inclined discharge outlet of the fully automatic peeling robot, and separating the seed and the shell of each of first ones of the peanuts by a movement of a screening plate of the screening mechanism, and collecting the seed to enable a desired effect;

when the peanuts after being detected are suitable to be used as seeds and heads of second ones of the peanuts towards a direction which is opposite to the moving direction of the first conveyor belt, controlling a second single-arm robot, a second miniature single-arm robot and a second pneumatic finger of the first bracket assembly to grab the second ones of the peanuts onto a third conveyor belt of the fully automatic peeling robot, and enabling unqualified peanuts of the second ones the peanuts to follow a movement of the first conveyor belt and fall off;

detecting positions and states of the second ones of the peanuts which are on the third conveyor belt by a third camera sensor of the sensor device, wherein the third conveyor belt has a same movement direction as the first conveyor belt;

transmitting third data to the controller after detecting that the second ones of peanuts which are on the third conveyor belt reach a third predetermined position, enabling the second ones of the peanuts follow the third conveyor belt to move to an end of the third conveyor belt and fall longitudinally into a groove of a second direction conversion disc of the conversion device, controlling a second direction conversion motor of the conversion device to drive the second direction conversion disc to rotate by the controller, so as to change the second ones of the peanuts to be in the vertical state, and stopping the second direction conversion motor;

moving a sixth pneumatic finger of the fully automatic peeling robot to a position corresponding to the second ones of the peanuts that are in the vertical state by a fourth horizontal single-arm robot and a sixth longitudinal single-arm robot of the fully automatic peeling robot, grabbing the second ones of the peanuts by the sixth pneumatic finger and applying another clamping force to the second ones of the peanuts to form other small openings thereon, driving the sixth pneumatic finger to move towards a seventh pneumatic finger and a eighth pneumatic finger of the fully automatic peeling robot by the fourth horizontal single-arm robot, and enabling the sixth pneumatic finger to reach a fourth predetermined position; moving each of the seventh pneumatic finger and the eighth pneumatic finger by a corresponding connected miniature single-arm robot of the fully automatic peeling robot, and enabling each of the seventh pneumatic finger and the eighth pneumatic finger to grab a corresponding side of one of the second ones of the peanuts, and to move in another opposite direction simultaneously, so as to divide another shell of the one of the second ones of the peanuts into two parts;

enabling another seed and the another shell of each of the second ones of the peanuts after another dividing to fall into the screening mechanism through a second inclined discharge outlet of the fully automatic peeling robot, and separating the another seed and the another shell of each of the second ones of the peanuts by the movement of the screening plate of the screening mechanism, and collecting the seed to enable a desired effect.

* * * * *